United States Patent [19]

Tarbox

[11] Patent Number: 5,701,378
[45] Date of Patent: Dec. 23, 1997

[54] OPTICAL STRUCTURES WITH TWO OPTICAL GUIDANCE PATHS

[75] Inventor: Eleanor Joan Tarbox, Southampton, England

[73] Assignee: Pirelli General plc, England

[21] Appl. No.: 671,650

[22] Filed: Jun. 28, 1996

[30] Foreign Application Priority Data

Jul. 4, 1995 [GB] United Kingdom ............ 9513582

[51] Int. Cl.$^6$ ............................................. G02B 6/22
[52] U.S. Cl. ........................ 385/126; 385/141; 385/132; 385/1
[58] Field of Search ................ 385/126, 141–145, 385/1, 132

[56] References Cited

U.S. PATENT DOCUMENTS

| | | | |
|---|---|---|---|
| 4,748,687 | 5/1988 | Auracher et al. | 455/609 |
| 4,778,238 | 10/1988 | Hicks | 350/96.16 |
| 5,295,211 | 3/1994 | Weidman | 385/43 |

FOREIGN PATENT DOCUMENTS

| | | | |
|---|---|---|---|
| 037793A3 | 1/1981 | European Pat. Off. | G02B 7/26 |
| 0112090 | 6/1984 | European Pat. Off. | H01S 3/06 |
| 308114A3 | 3/1989 | European Pat. Off. | G02F 1/03 |
| 324541A3 | 3/1990 | European Pat. Off. | H01S 3/06 |
| 417441A1 | 3/1991 | European Pat. Off. | H01S 3/06 |
| 442518A3 | 8/1991 | European Pat. Off. | G02F 1/313 |
| 2209846 | 5/1989 | United Kingdom | G02B 6/02 |
| 93/01518 | 1/1993 | WIPO | G02F 1/35 |

OTHER PUBLICATIONS

IEEE Photonics Technology Letters Nov. 1989, vol. 1, No. 11, pp. 386–388.
Patent Abstracts of Japan, vol. 017, No. 566 (P–1629), Oct. 14, 1993.
Electronics Letters, vol. 30, No. 25, Dec. 8, 1994, pp. 2165–2166.

Primary Examiner—John Ngo
Attorney, Agent, or Firm—Brooks Haidt Haffner & Delahunty

[57] ABSTRACT

An optical structure having two optical guidance paths between which coupling occurs in a band about one predetermined wavelength is manufactured by providing an optical structure having two optical guidance paths with respective propagation constants 12', 14' which vary differently with wavelength and coincide at one given wavelength $\lambda'$ arranged such that coupling occurs between said optical guidance paths in a band about said one given wavelength and subjecting the or at least one of the guidance paths which includes a radiation responsive refractive index changing dopant to radiation to change the propagation constant thereof until said one given wavelength equals said one predetermined wavelength $\lambda''$.

24 Claims, 2 Drawing Sheets

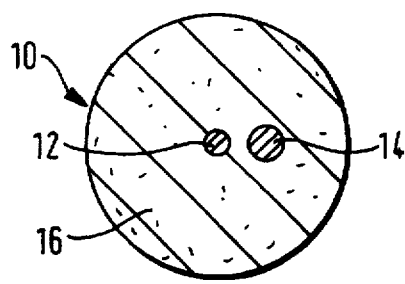
FIG. 1
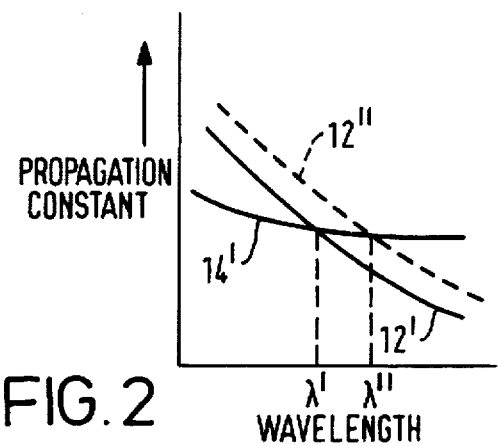
FIG. 2
FIG. 3
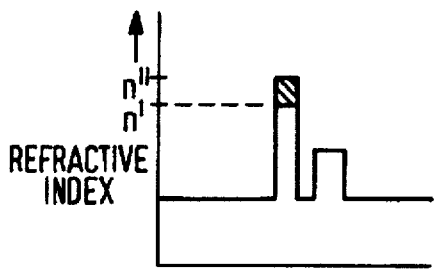
FIG. 4
FIG. 5
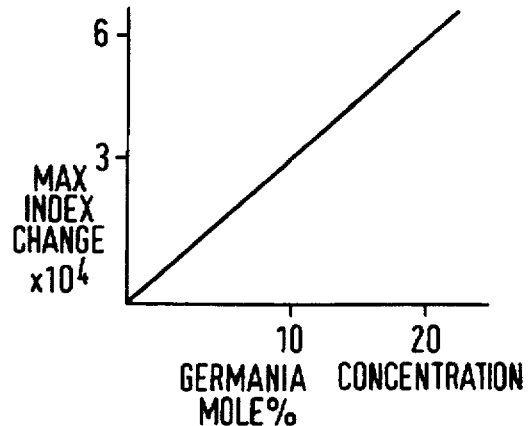
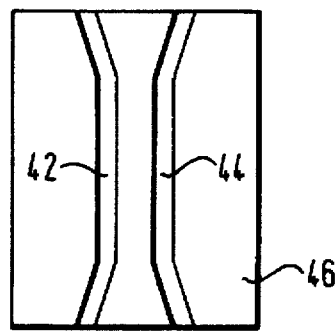
FIG. 6
FIG. 7

OPTICAL STRUCTURES WITH TWO OPTICAL GUIDANCE PATHS

This invention relates to optical structures having two optical guidance paths between which coupling occurs in a band about a predetermined wavelength.

Such structures comprise integrated optics planar devices and optical fibre structures and have many applications, for example in filtering, amplifying and sensing strain and temperature. For example: an article by R. C. Alferness and R. V. Schmidt on pages 161–163 of Applied Physics Letters 33(2) dated 15 Jul. 1978 discloses a two waveguide integrated optics planar device which functions as a filter; EP-A-0308114 relates to a two core optical fibre structure which is operable as a filter; EP-A-0324541 and EP-A-417441 each disclose optical fibre amplifiers which include a two core optical fibre; and EP-A-0250194 discloses a strain and temperature sensing apparatus which includes a two core optical fibre.

A problem which arises in manufacturing such optical structures is ensuring that coupling between the optical guidance paths occurs in a band about the required predetermined wavelength. The known structures are manufactured such that the two guidance paths have respective propagation constants which vary differently with wavelength and coincide at one wavelength and are arranged such that coupling occurs between the guidance paths in a band about that wavelength. The propagation constant of each path is a function of parameters of the waveguide or core and the material immediately surrounding the same and in particular the refractive indices thereof. Thus it is difficult to ensure that the wavelength at which the propagation constants coincide is the required coupling wavelength. This difficulty has been met by tuning the structure after manufacture by changing the propagation constant of at least one of the guidance paths to shift the wavelength at which the propagation constants coincide from the wavelength obtained on manufacture to the required coupling wavelength. In the Applied Physics Letters article and in EP-A-0308114 and EP-A-0324541 this is achieved by applying an electric field. However, this is disadvantageous in that not only do electrodes have to be incorporated into the structures but also the electric field needs to be applied during use.

It is also known to tune the wavelength by changing the propagation constants of the guidance paths of a two core fibre by straining the fibre by bending and/or twisting until the required coupling wavelength is obtained and potting the fibre to retain it in its deformed condition. This tuning has the advantage that it can be carried out at part of the manufacturing process but it is disadvantageous in that it requires the fibre to be mechanically stressed, polarisation problems can arise and only a relatively small shifting of the wavelength is possible.

In accordance with the present invention the above-mentioned problem is solved in a way, which can be carried out as part of the manufacturing process and which does not require straining, by changing the propagation constant of at least one of the guidance paths by subjecting it to radiation.

An article by G. R. Atkins et al on pages 2165/6 of Electronics Letters 8th Dec. 1994 Vol. 30 No. 25 discloses subjecting one core of a two core fibre with nominally identical cores (and therefore nominally identical propagation constants at all wavelengths) to UV radiation in order to match the cores to improve coupling between the cores at all wavelengths.

The present invention provides a method of manufacturing an optical structure having two optical guidance paths between which coupling occurs in a band about one predetermined wavelength: said method comprising providing an optical structure having two optical guidance paths with respective propagation constants which vary differently with wavelength and coincide at one given wavelength arranged such that coupling occurs between said optical guidance paths in a band about said one given wavelength, said structure including a radiation responsive refractive index changing dopant substantially throughout the length of at least one of said guidance paths over at least a region of the cross-section thereof; and subjecting the or at least one of the guidance paths including said dopant to radiation to change the propagation constant thereof until said one given wavelength equals said one predetermined wavelength.

The method may be carried out such that said one given wavelength is increased to said one predetermined wavelength by said radiation subjecting step. Alternatively the method may be carried out such that said one given wavelength is decreased to said one predetermined wavelength by said radiation subjecting step.

Preferably the radiation is applied in steps to incrementally change said one given wavelength until it equals said one predetermined wavelength.

The radiation may be launched along the or one of the paths including said dopant. In this case the radiation may be used to change the propagation constant of only the path along which it is launched.

Instead the radiation may be directed transversely at said paths. In this case the radiation may be used to change the propagation constant of the or each path which includes said dopant.

The method is applicable to the manufacture of integrated optics planar devices and to the manufacture of optical fibre structures. In the latter case preferably the optical structure provided comprises an optical fibre structure to which two cores are located within a common cladding to provide said two optical guidance paths, one of said cores being located centrally of said optical fibre and wherein said radiation is launched along said central core.

Preferably said two core fibre structure is spliced to a single core fibre, the single core of which is aligned with the central core of the two core fibre structure and said radiation is launched into said central core via said single core.

The optical fibre structure may be potted in a substantially mechanically unstressed condition prior to said radiation subjecting step.

The wavelength of the radiation for the radiation subjecting step is significantly removed from the wavelengths of the lightwaves which the cores of the two core fibre structure are to guide in use of the structure. Thus, for example, the radiation may have a wavelength substantially below 900 nm or substantially above 1600 nm. In the former case the radiation may be UV radiation at say 193.244 or 248 nm and in the latter case the radiation may be produced by a $CO_2$ laser which operates at 10600 nm and is preferably directed transversely at the paths.

UV radiation is advantageously used when the or each core of the fibre structure is doped with germania as a refractive index raising dopant since germania is also a UV radiation responsive refractive index raising dopant.

The, or at least one of the, guidance paths including said dopant is pretreated to enhance the change in the propagation constant thereof caused by said radiation.

Additionally or alternatively, such a guidance path may be provided with a rare earth dopant to enhance the change in the propagation constant thereof caused by said radiation.

The invention also includes an optical structure having two optical guidance paths between which coupling occurs in a band about one predetermined wavelength, wherein a radiation responsive refractive index changing dopant is present in said structure substantially throughout the length of at least one of said guidance paths over at least a region of the cross-section thereof, and wherein the or at least one of the guidance paths provided with said dopant has been subjected to radiation to change the propagation constant thereof such that the respective propagation constants of said guidance paths coincide at only said one predetermined wavelength.

The invention also includes a method of manufacturing a two core optical fibre structure in which coupling between the cores occurs in a band about one predetermined wavelength; said method comprising providing an optical fibre structure in which two cores are located within a common cladding to provide two optical guidance paths with respective propagation constants which vary differently with wavelength and coincide at one given wavelength and such that coupling occurs between said optical guidance paths in a band about said one given wavelength, at least one of said cores being doped with germania; and directing UV light into the or one of the cores doped with germania until said one given wavelength equals said one predetermined wavelength.

The invention also includes a two core optical fibre structure in which coupling occurs between the cores in a band about one predetermined wavelength, wherein at least one of the cores is doped with germania and the or at least one of the doped cores has been treated with UV light to change the propagation constant of the optical guidance path associated therewith such that the respective propagation constants of the optical guidance paths associated with the two cores coincide at only said one predetermined wavelength.

The invention also includes an optical amplifier comprising an optical structure made by a method as defined in the last but fourteen paragraph or as defined in the last but two paragraph, wherein said one predetermined wavelength is substantially equal the wavelength of signal to be amplified and a dopant capable of producing stimulated emission at the wavelength of the signal to be amplified when pumped by a pump signal of a different wavelength is present in one of said guidance paths, and a pump source connected to said one guidance path for launching a pump signal at said different wavelength therealong.

The invention also includes an optical fibre amplifier comprising a two core optical fibre structure made by a method as defined in the last but two paragraph or as defined in the last but one paragraph, wherein said predetermined wavelength of the signal to be amplified and one of said cores is doped with a dopant capable of producing stimulated emission at the wavelength of the signal to be amplified when pumped by a pump signal at a different wavelength, and a pump source connected to said one core for launching a pump signal at said different wavelength therealong.

The invention also includes an optical fibre telecommunications line comprising at least one amplifier as defined in the last or the last but one paragraph arranged such that a signal being transmitted along said line is fed into one end of the other guidance path or core and exits the other end thereof.

In order that the invention may be well understood, an embodiment thereof, which is given by way of example only, will now be described with reference to the accompanying drawings, in which:

FIG. 1 is a radial cross-section of a two core optical fibre structure;

FIG. 2 shows propagation constants of the two core fibre structure of FIG. 1 before and after irradiation.

FIG. 3 shows the two core fibre structure of FIG. 2 spliced to input and output single core fibre tails;

FIG. 4 shows the refractive index profile of the two core fibre structure of FIG. 2 before and after irradiation;

FIG. 5 is a graph showing maximum refractive index change by UV radiation against germania concentration;

FIGS. 6 and 7 are plan and end views respectively of a two wavelength integrated optics planar device.

Figure 8:
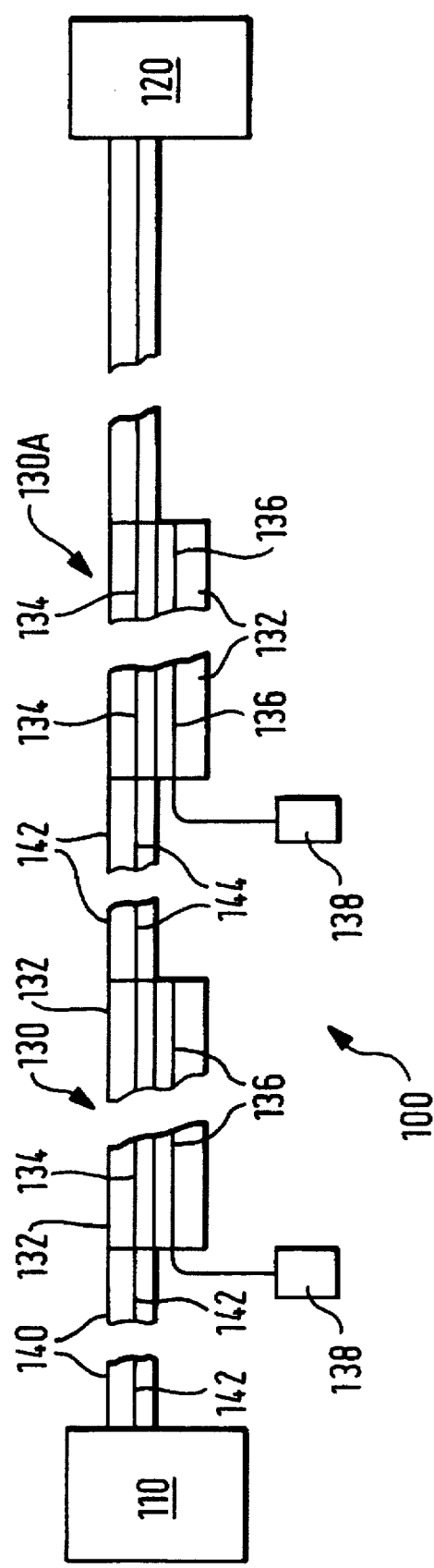
FIG. 8 schematically shows an optical fibre telecommunications line.

FIG. 1 illustrates an optical fibre structure 10 which comprises two optical cores 12, 14 located within a common cladding 16. One core 12 is located centrally of the optical fibre structure 10 and the other core is offset therefrom. The cores are uniformly spaced apart throughout the length of the fibre structure 10 and each core 12, 14 provides a respective optical guidance path which extends laterally beyond the core itself and the spacing between the cores is sufficiently small that their optical guidance paths will overlap to permit coupling. The material, diameter and refractive index of each core is selected such that the two optical guidance paths provided by the cores have propagation constants which vary differently with wavelength and coincide at one given wavelength. In FIG. 2 the solid lines 12', 14' represent the propagation constants for the two guidance paths provided by the cores 12, 14 of fibre structure as drawn from a preform. As will be seen the propagation constants coincide at wavelength $\lambda'$. It is at this wavelength and at wavelengths immediately adjacent thereto that light couples between the guidance paths. The width of the passband around $\lambda'$ at which light couples between the guidance paths depends inter alia on the extent to which the propagation constants depart from each other to each side of $\lambda'$.

The cores are silica doped throughout their lengths at least over a region thereof with germania as a refractive index raiser dopant. Due to the presence of germania permanent changes to the refractive indices, and thereby the propagation constants, of the cores can be made by subjecting the fibre structure to UV radiation. Thus germania in the cores is a radiation responsive refractive index changing dopant as well as a refractive index raiser dopant.

By changing one or both of the propagation constants the wavelength at which the propagation constants coincide can be modified. The propagation constants of the guidance paths provided by both cores can be changed until the wavelength at which the propagation constants coincide is the required coupling wavelength for the application to which the fibre structure is to be put by launching radiation along the paths provided by each core at the same or different cumulative intensities or by directing the radiation transversely of the paths. However, preferably the propagation constant of only one of the guidance paths is changed, and preferably this path is the path provided by the central core. The central core is preferred since a radiation may be launched into it via a conventional single core fibre tail fusion spliced to the two core fibre structure with its single core which is central of the tail aligned with the central core of the two core fibre. In FIG. 3, an input single core fibre tail 20 is spliced to one end of the two core fibre structure 10 with its core 22 aligned with the central core 12 of the two core fibre structure 10. Also an output single core fibre tail 30 is spliced to the other end of the two core fibre structure 10 with its core 32 aligned with the central core 12 of the fibre structure 10.

UV irradiation of the central core 12 increases its refractive index and causes the propagation constant to increase for each value of wavelength. Thus, after being subjected to UV radiation the propagation constant of the guidance path provided by the central core shifts to a position such as that indicated by dotted line 12" in FIG. 2 and the wavelength at which the propagation constants of the two paths coincide increases from $\lambda'$ to $\lambda''$.

Thus, preferably the two core fibre structure as drawn from its preform has two optical guidance paths which coincide at a wavelength which is less rather than more than the required coupling wavelength, so that tuning can be carried out by launching UV radiation into the central core. However, if the drawn fibre structure has optical guidance paths which coincide at a wavelength which is more than the required wavelength tuning can be carried out instead by launching irradiation into the offset core. Fine adjustments to the tuning of the coupling wavelength and also the extent of the passband are possible by subjecting both guidance paths to radiation. It will be understood that the output tail is provided to enable monitoring of the radiation step to ensure that the whole of the length of the two core optical fibre is subjected to radiation.

The fibre may be pretreated with hydrogen to enhance the increase in refractive index caused by the UV radiation. Additionally or alternatively the core or cores which are to be subject to UV radiation may include a rare earth dopant which enhances the increase in refractive index caused by that radiation.

In accordance with one method, after the fibre tails 20 and 30 have been spliced to respective ends of a fibre structure 10 as aforesaid, the fibre structure is potted in a substantially mechanically unstressed condition for maintaining its mechanical and thermal stability. The coupling characteristics are measured to check that the coupling wavelength is less than that required, and a pulse of high intensity UV light, for example 30 mW, is launched into central core 12 via the input tail 20 and detected as exit from the output tail 30. The coupling characteristics of the fibre structure 10 are remeasured and if the coupling wavelength is still less than that required the above procedure is repeated. Thus the UV radiation is applied in steps to incrementally increase the coupling wavelength until it equals the required wavelength.

As shown diagrammatically by FIGS. 4 and 2 respectively, the above described method increases the refractive index of the central core 12 (from n' before irradiation to n" thereafter) and also increases the propagation constant for the guidance path provided by the central core 12 at each wavelength thus shifting the coupling wavelength from $\lambda'$ to $\lambda''$.

Of course, if the initial measurement of the coupling characteristics showed that the coupling wavelength is more than that required, the fibre structure may be connected to new tails which would enable the offset core 14 to be subjected to UV radiation and radiation applied to the offset core in steps to incrementally decrease the coupling wavelength until it equals the required coupling wavelength.

FIG. 5 indicates the relationship between germania concentration and the increase in refractive index possible using UV radiation as described above. In one specific example the maximum index change induced by UV radiation in a 10 mole % germania doped core having an initial refractive index of 1.4635 is 0.0003.

It is envisaged that radiation at other wavelengths may be used to change the propagation of the or each core. For example, it is contemplated that radiation produced by a $CO_2$ laser may be used. A $CO_2$ laser operates at 10600 nm which is substantially above the operating wavelengths at which known two core fibre structures are utilised. Likewise UV radiation which is typically produced by known sources at 193, 244 and 248 nm is substantially below such wavelengths.

As will be appreciated the cores of the two core fibre structure must be such that the refractive index raising affect described above does not occur at normal operating powers and wavelengths but instead should occur at powers and wavelengths removed therefrom. In practice for at least some of the applications outlined above for two core fibre structures these wavelengths may be taken to the substantially below 900 nm and substantially above 1600 nm.

Whilst the above-described embodiment concerns a two core fibre structure it will be understood that the invention is also applicable to two waveguide integrated optical planar devices. One such device 40 is schematically illustrated in FIGS. 6 and 7 and comprises two single mode strip optical waveguides 42, 44 provided on a substrate 46. The waveguides provide two optical paths with respective propagation constants which vary differently with wavelength and coincide at one given wavelength. The waveguides include central portions which are closely adjacent such that coupling at that given wavelength occurs. At least one of the guidance paths (and typically the strip waveguide providing the same) includes a radiation responsive refractive index changing dopant and accordingly the propagation constant of the or at least one of the guidance paths including this dopant can be changed by the application of radiation in order to change the wavelength at which the propagation constants coincide to a required wavelength.

As mentioned in the introduction, optical structures having two optical guidance paths are applicable for amplifying optical signals. Referring now to FIG. 8 there is schematically illustrated an optical fibre telecommunications line 100 extending between a transmitter 110 and a receiver 120. The line includes a plurality of optical fibre amplifiers, two of which are illustrated at 130 and 130A.

Each optical fibre amplifier comprises a two core optical fibre structure 132 which has been made in accordance with the above-described method. The predetermined wavelength at which coupling between the two cores 134 and 136 of the optical fibre 132 occurs is tuned by the above-described method so that it is equal to or substantially equal to the wavelength of the signal which is transmitted in the line 130.

The core 136 is doped with a dopant capable of producing stimulated emission in a band including the wavelength of the signal which is being transmitted when pumped by a pump signal at a different wavelength. In this example, the core 136 is doped with erbium which produces stimulated emission at wavelengths between 1530 and 1550 nm when pumped at 980 nm. A pump source 138 is connected to one end of the core 136 to launch the pump signal along that core. The amplifiers in FIG. 8 are pumped such that the pump signals and signals which are being transmitted co-propagate. However, the pump source may be connected to the core 136 so that the pump signal and the signal being transmitted counter-propagate. Also, it will be understood that the core 136 could have pump sources connected to both of its ends.

The signal in the band 1530–1550 nm being transmitted from the transmitter 110 towards the receiver 120 travels along an optical fibre 140 until after a considerable distance it is necessary to amplify the signal in view of its attenuation. At this point the optical fibre 140 is spliced to the two core fibre 132 such that its single core 142 is connected to the core 134 of the two-core fibre of the amplifier 130. The signal transfers repeatedly between the cores and is amplified when in the core 136 which is pumped at 980 nm by the pump source 138. The amplified signal exits the amplifier 130 and is transmitted along optical fibre 142, whose single core 144 is spliced to core 134, towards the next amplifier 130A.

I claim:

1. A method of manufacturing an optical structure having two optical guidance paths between which coupling occurs in a band about one predetermined wavelength: said method comprising providing an optical structure having two optical guidance paths with respective propagation constants which vary differently with wavelength and coincide at one given wavelength arranged such that coupling occurs between said optical guidance paths in a band about said one given wavelength, said structure including a radiation responsive refractive index changing dopant substantially throughout the length of at least one of said guidance paths over at least a region of the cross-section thereof; and subjecting the or at least one of the guidance paths including said dopant to radiation to change the propagation constant thereof until said one given wavelength equals said one predetermined wavelength.

2. A method as claimed in claim 1, wherein said one given wavelength is increased to said one predetermined wavelength by said radiation subjecting step.

3. A method as claimed in claim 1, wherein said one given wavelength is decreased to said one predetermined wavelength by said radiation subjecting step.

4. A method as claimed in claim 1, wherein said radiation is applied in steps to incrementally change said one given wavelength until it equals said one predetermined wavelength.

5. A method as claimed in claim 1, wherein said radiation is launched along the or one of the paths including said dopant.

6. A method as claimed in claim 1, wherein said radiation is directed transversely at said paths.

7. A method as claimed in claim 1, wherein said optical structure provided comprises an optical fibre structure in which two cores are located within a common cladding to provide said two optical guidance paths.

8. A method as claimed in claim 1, wherein said optical structure provided comprises an optical fibre structure in which two cores are located within a common cladding to provide said two optical guidance paths, one of said core being located centrally of said optical fibre and wherein said radiation is launched along said central core.

9. A method as claimed in claim 8, wherein said two core fibre structure is spliced to a single core fibre, the single core of which is aligned with the central core of the two core fibre structure and said radiation is launched into said central core via said single core.

10. A method as claimed in claim 7, wherein said optical fibre structure is potted in a substantially mechanically unstressed condition prior to said radiation subjecting step.

11. A method as claimed in claim 7, wherein said radiation has a wavelength substantially below 900 nm.

12. A method as claimed in claim 11, wherein said radiation is UV radiation.

13. A method as claimed in claim 12, wherein said radiation responsive refractive index dopant is germania.

14. A method as claimed in claim 7, wherein said radiation has a wavelength substantially above 1600 nm.

15. A method as claimed in claim 14, wherein said radiation is produced by a $CO_2$ laser.

16. A method as claimed in claim 1, wherein the, or at least one of the, guidance paths including said dopant is pretreated to enhance the change in the propagation constant thereof caused by said radiation.

17. A method as claimed in claim 1, wherein the, or at least one of the, guidance paths including said dopant is provided with a rare earth dopant to enhance the change in the propagation constant thereof caused by said radiation.

18. An optical structure having two optical guidance paths between which coupling occurs in a band about one predetermined wavelength, wherein a radiation responsive refractive index changing dopant is present in said structure substantially throughout the length of at least one of said guidance paths over at least a region of the cross-section thereof, and wherein the or at least one of the guidance paths provided with said dopant has been subjected to radiation to change the propagation constant thereof so that the propagation constant is different from the propagation constant of the same the or at least one guidance paths without having been subjected to radiation such that the respective propagation constants of said guidance paths coincide at only said one predetermined wavelength.

19. An optical amplifier comprising an optical structure as claimed in claim 18, wherein said one predetermined wavelength is substantially equal the wavelength of signal to be amplified and a dopant capable of producing stimulated emission at the wavelength of the signal to be amplified when pumped by a pump signal of a different wavelength is present in one of said guidance paths, and a pump source connected to said one guidance path for launching a pump signal at said different wavelength therealong.

20. An optical fibre telecommunications line comprising at least one amplifier as claimed in claim 19 arranged such that a signal being transmitted along said line is fed into one end of the other guidance path or core and exits the other end thereof.

21. A method of manufacturing a two core optical fibre structure in which coupling between the cores occurs in a band about one predetermined wavelength: said method comprising providing an optical fibre structure in which two cores are located within a common cladding to provide two optical guidance paths with respective propagation constants which vary differently with wavelength and coincide at one given wavelength and such that coupling occurs between said optical guidance paths in a band about said one given wavelength, at least one of said cores being doped with germania; and directing UV light into the or one of the cores doped with germania until said one given wavelength equals said one predetermined wavelength.

22. A two core optical fibre structure in which coupling occurs between the cores in a band about one predetermined wavelength, wherein at least one of the cores is doped with germania and the or at least one of the doped cores has been treated with UV light to change the propagation constant of the optical guidance path associated therewith so that the propagation constant is different from the propagation constant of the same the or at least one core without having been treated to with radiation such that the respective propagation constants of the optical guidance paths associated with the two cores coincide at only said one predetermined wavelength.

23. An optical fibre comprising a two core optical fibre structure as claimed in claim 22, wherein said predetermined wavelength of the signal to be amplified and one of said cores is doped with a dopant capable of producing stimulated emission at the wavelength of the signal to be amplified when pumped by a pump signal at a different wavelength, and a pump source connected to said one core for launching a pump signal at said different wavelength therealong.

24. An optical fibre telecommunications line comprising at least one amplifier as claimed in claim 23 arranged such that a signal being transmitted along said line is fed into one end of the other guidance path or core and exits the other end thereof.

* * * * *